United States Patent
Gupta et al.

[11] Patent Number: 5,771,577
[45] Date of Patent: Jun. 30, 1998

[54] METHOD FOR MAKING A FLUID COOLED ARTICLE WITH PROTECTIVE COATING

[75] Inventors: Bhupendra K. Gupta, Cincinnati; Robert P. Ziegler, Montgomery; Wilbur D. Scheidt, Cincinnati, all of Ohio

[73] Assignee: General Electric Company, Cincinnati, Ohio

[21] Appl. No.: 649,352

[22] Filed: May 17, 1996

[51] Int. Cl.$^6$ .................................................. B23D 15/00
[52] U.S. Cl. .................................. 29/889.721; 29/889.72
[58] Field of Search .......................... 29/889.1, 889.721, 29/889.72, 557, 527.2, 527.4, 558

[56] References Cited

U.S. PATENT DOCUMENTS

| | | | |
|---|---|---|---|
| 3,692,639 | 9/1972 | Dederra et al. | 29/889.721 |
| 4,726,104 | 2/1988 | Foster et al. | 29/156.8 |
| 4,762,464 | 8/1988 | Vertz et al. | 29/889.721 |
| 4,770,608 | 9/1988 | Anderson et al. | 416/97 R |
| 5,096,379 | 3/1992 | Stroud et al. | 416/97 R |
| 5,113,582 | 5/1992 | Monson et al. | 29/889.2 |
| 5,192,192 | 3/1993 | Ourhaan | 416/97 R |
| 5,215,785 | 6/1993 | Strasser et al. | 427/230 |
| 5,216,808 | 6/1993 | Martus et al. | 29/889.1 |
| 5,356,265 | 10/1994 | Kercher | 416/97 R |
| 5,419,039 | 5/1995 | Auxier et al. | 29/889.721 |

Primary Examiner—Irene Cuda
Attorney, Agent, or Firm—Andrew C. Hess; Nathan D. Herkamp

[57] ABSTRACT

A fluid cooled article having a protective coating on a surface, for example an air cooled gas turbine engine article having a Thermal Barrier Coating, includes through an article wall a fluid cooling passage, and typically a plurality of passages, having openings sized to maintain desired fluid flow, unobstructed by coating within the passage at an exit opening. The passage has a first or inlet opening, which establishes the amount of fluid flow through the passage, and a second opening through which the flow exits the passage through a wall surface on which the coating is deposited. A method for making the article to have such unobstructed flow includes selecting a cross sectional area for the first opening, selecting a coating method for deposit of the coating, in a selected thickness range, on the wall surface and partially within the passage at the second opening, and generating the passage to have a second opening with a cross sectional area greater than that of the first opening by an amount which is no less than a reduction in cross sectional area resulting from partial deposit of the coating through the second opening.

6 Claims, 2 Drawing Sheets

5,771,577

METHOD FOR MAKING A FLUID COOLED ARTICLE WITH PROTECTIVE COATING

FIELD OF THE INVENTION

This invention relates to surface protected fluid cooled articles having cooling passages exiting an outer surface through a cooling opening, and to a method for making such articles. It particularly relates to air cooled high temperature operating gas turbine engine articles.

BACKGROUND OF THE INVENTION

Advanced gas turbine engine components operating into the hot sections of the engine can experience temperatures which can contribute to reduction in the operating life of the components, Generally, such components include combustors, turbine blades and vanes, turbine shrouds and various components in the exhaust system. To improve component life, such components have been designed to include cooling passages within the body of the component exiting a surface or about a component surface. For additional thermal and/or environmental resistance, frequently there is included on a surface exposed to higher temperatures, a high temperature protective coating such as a metallic or ceramic type coating. Examples of such coatings, widely reported in the art, include aluminides, MCrAlY (in which M is at least one of the elements Fe, Co, and Ni), various metal overlay type coatings, and ceramic thermal protective coatings, one type of which is referred to in the art as Thermal Barrier Coatings or TBC. Although the present invention relates to all such coatings, of particular interest are the TBC coatings.

Typical of TBC coatings, for example as used in the gas turbine art, is one based on zirconia stabilized with yttria, for example about 92 wt. % zirconia stabilized with about 8 wt. % yttria. A preferred method for application of a TBC coating is by plasma spray using apparatus sold commercially for that purpose. Frequently, such coatings are used with a metallic bond coat. This general type of TBC coating has been reported for some time as evidenced by such U.S. Pat. Nos. 4,055,705—Stecura et al. (patented Oct. 25, 1977); 4,095,003—Weatherly et al. (patented Jun. 13, 1978); 4,328,285 Siemers et al. (patented May 4, 1982); 5,216,808—Martus et al. (patented Jun. 8, 1993); and 5,236,745—Gupta et al. (patented Aug. 17, 1993). The disclosure of each of these patents hereby is incorporated herein by reference.

The above incorporated Martus et al. patent shows one configuration of a fluid cooled, in this example air cooled, gas turbine engine turbine blade. Such blade has a 5 hollow interior connected through cooling passages, such as cooling channels or holes through the wall, to the outer wall surface. Protecting the outer surface, in one form of the invention, is a TBC coating. Because the cooling holes are constructed of a size to provide proper or desired cooling of the blade during engine operation, reduction in fluid flow through the holes should not be restricted as a result of such a surface application. Therefore, Martus et al., in one form of their invention, teach removing from any cooling hole excess material, for example TBC, obstructing flow through the hole. It has been found that, in some cases, laser drilling after TBC coating is unsatisfactory because of cracking at the interface between the TBC and its substrate. Although Martus et al. describe a method for removing undesirable flow blockage, eliminating the need for such a removal step would reduce risk of interface cracking, and would lower manufacturing cost and increase manufacturing efficiency.

SUMMARY OF THE INVENTION

The present invention, in one form, provides, in a method for making a fluid cooled article including a protective coating on a wall surface, steps for generating through a wall a fluid cooling passage shaped to avoid detrimental blockage of cooling fluid through the passage as a result of coating application. The fluid cooling passage extends from a first opening in a first wall surface to a second opening in a second wall surface, with the second wall surface including a protective coating, at least adjacent the second opening. The method includes selecting a first cross sectional area for the first opening to establish a desired amount of cooling fluid flow through the cooling passage.

Also selected is a coating method and a coating thickness, the coating method partially depositing a coating amount within the passage at the second opening. The fluid cooling passage is generated, prior to coating, so that the first opening has the first cross sectional area and the second opening has a second cross sectional area greater than the first cross sectional area by an area amount which is no less than, or at least equal to, a reduction in coating cross sectional area resulting from the partial depositing of the coating within the passage. As a result of generating such a configuration, subsequent deposit of the coating partially within the second opening does not restrict fluid flow through the passage below the amount established by the first opening, and subsequent coating removal from the vicinity of the second opening is not required.

Another form of the present invention provides a fluid cooled article including a wall having therethrough a plurality of fluid cooling passages, each extending from the first opening to the second opening, configured as described above, to pass cooling fluid. The second surface includes a protective coating thereon about and partially within the plurality of second openings.

DESCRIPTION OF THE PREFERRED EMBODIMENTS

Figure 1:
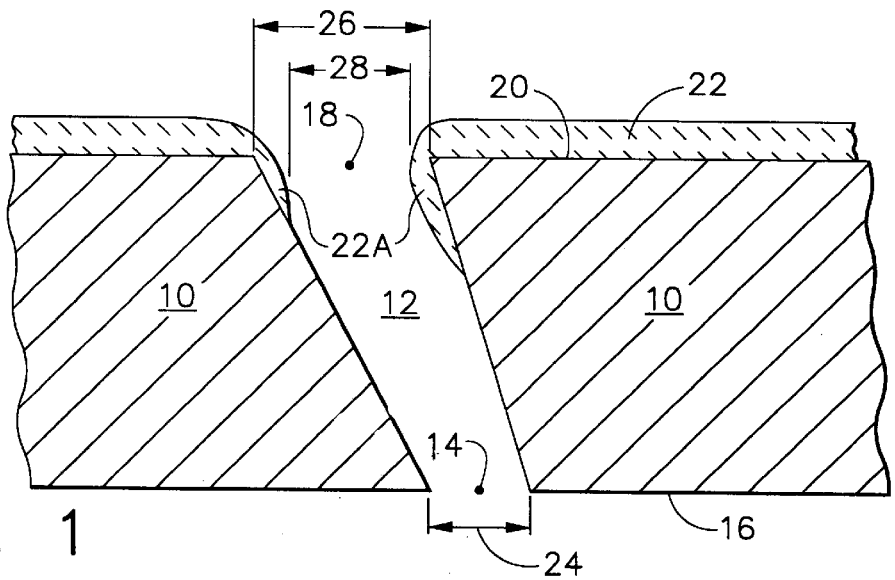
FIG. 1 is a fragmentary sectional view of a fluid cooled wall including a cooling passage therethrough, shaped according to the present invention, and including a protective coating on a wall surface and partially within the passage.

Cooling passages and holes of various sizes and shapes have been used in the gas turbine art, for example in gas turbine blades and vanes as well as combustors. Some may, as a result of manufacturing techniques, be tapered, generally slightly and in any event in a generally uncontrolled manner, from within the component to an outside surface.

However, prior to the present invention, the shape of such openings have not been controlled on coated surfaces responsive to a control inlet opening and to the coating method and the amount of coating partially deposited within an exit opening in an amount which can detrimentally reduce cooling fluid flow.

Typical methods used in the manufacture of gas turbine engine components for providing openings through walls include casting in the holes using appropriately shaped molds and cores, mechanical drilling or machining, abrasive grit drilling, and material removal by electro-discharge, electro-chemical or laser. All of these methods are widely known and have been reported in the art. To some extent, each provides a unique shape resulting from parameters of the apparatus and method used. Currently, of particular interest in connection with turbine components is removal of material using a laser focused for drilling holes. During evaluation of the present invention, a commercial Nd:YAG type of laser was used to drill holes in high temperature alloy material, for example alloys based on at least one of the elements Fe, Co and Ni.

The fragmentary sectional view of FIG. I shows an alloy wall 10 of a gas turbine engine combustor, one form of which is made of a widely used Ni base alloy commercially 5 available as Hastelloy X alloy. Through wall 10 is a fluid cooling passage 12 extending from a first opening 14 in a first wall surface 16 to a second opening 18 in a second wall surface 20. The flow of cooling fluid, which passes through the passage from the first opening 14 through the second opening 18, is established by the size of opening 14.

Deposited on second wall surface 20 is a protective coating 22 some of which has been deposited within the passage through the second opening 18, as shown at 22A. For example, this can occur from plasma deposition of ceramic type coatings, such as TBC.

According to the present invention, the cross sectional area of first opening 14 is selected to provide desired cooling fluid flow through the passage, and selected are the particular coating thickness and method which will partially deposit a coating amount within passage 12 through opening 18. Then the cross sectional area of opening 18 is sized and then generated to be greater than the cross sectional area of control opening 14 by an area amount no less than, and from a practical manufacturing viewpoint greater than, a reduction in coating cross sectional area resulting from the partial depositing of coating 22 within passage 12 in the vicinity of second opening 18, as shown at 22A in FIG. 1.

For simplicity of presentation of one form of the invention, it will be assumed in FIG. 1 that the passage 12 is of substantially circular cross section, generally as would result from laser drilling of passage 12. The cross sectional area of first opening 14 is based on diameter 24 and the cross sectional area of second opening 18, prior to coating, is based on diameter 26. After coating by a method which will partially deposit coating within passage 12 at second opening 18, the diameter of the second opening is reduced by a coating amount 22A to result in a diameter 28. According to the present invention and FIG. 1, in this example diameter 26 of second opening 18 is generated to be greater than diameter 24 of first opening 14 by an amount no less than the difference between diameters 26 and 28, representing the reduction in diameter of the second opening resulting from deposition of the coating within the passage, as shown. For example, if laser drilling is used to drill a preform of passage 12 with a diameter generally the size of diameter 24, the second opening and the final shape of passage 12 can be generated to have an appropriately larger diameter 26 by expanding the focus of the drilling laser in a subsequent, controlled pass over the passage. In this way, the amount of cooling fluid established by the size of first opening 14 is not reduced by subsequent coating and any need to remove coating is eliminated. In addition, no change in the direction of fluid flow results. In actual practice, drilling a passage of substantially circular cross section with the wall itself can result in an opening on a surface which is other than circular if the drilling is at an angle to such surface. Therefore, except for this simplified presentation, reference herein to circular cross section means within the passage, for measurement for practice of the present invention, and not necessarily at the openings. For openings and passages other than of circular cross section, the present invention is described, in respect to the flow of fluid through passage 12, wherein the first opening 14 has a first cross sectional area and the second opening 18 has a second cross sectional area greater than the first cross sectional area by an area amount no less than a reduction in coating cross sectional area resulting from partial depositing of the coating within passage 12 at the second opening 18.

Figure 2A:
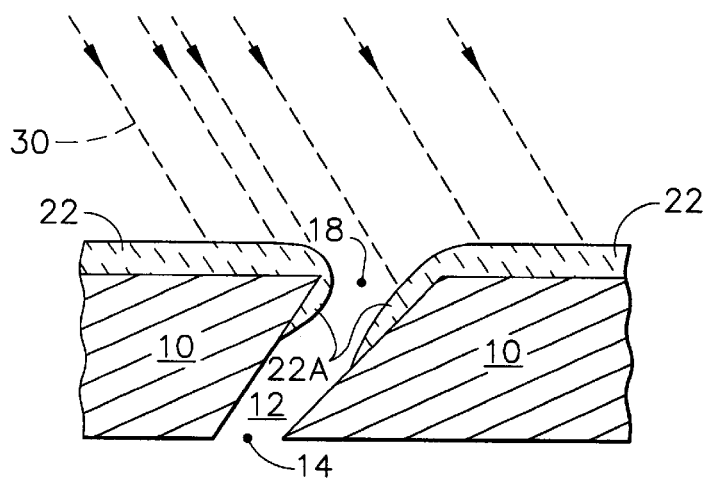
FIGS. 2A and 2B are fragmentary sectional views of a wall as in FIG. 1 showing different directions for plasma deposition of a TBC as the protective coating, and the partial deposition of TBC within the cooling passage.
Figure 2B:
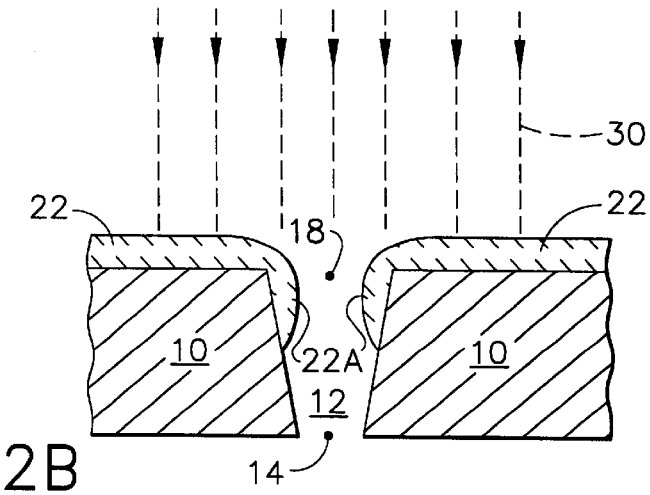

Deposition of coating within passage 12 can occur when a coating is applied by plasma spraying. The amount of coating so deposited is a function, at least in part, of the direction the passage is generated in wall 10 and the angle of deposition. The fragmentary sectional views of FIGS. 2A and 2B show the general amounts of the coating deposited at different deposition orientations to second surface 20. The passage is generated and the coating is deposited at an angle to the second surface as in FIG. 2A, and substantially normal to the second surface as in FIG. 2B. When plasma spraying of TBC is used, it has been found that an angle of spray, represented by broken lines and arrows 30, of less than about 30° results in a relatively poor coating. Therefore, practice of the present invention with a TBC coating establishes the angle of spray of greater than 30° up to about 90° to second wall surface 20.

FIG. 2A shows that when spraying the coating at an angle, with the spray oscillating from side to side across surface 20 as is common practice in the art, the coating is deposited within passage 12 through second opening 18 in a substantially non-uniform manner. Such deposition is a function of the angle of the passage and the angle of the spray to second surface 20. Therefore, by adjusting the angle of spray to the designed angle of the passage, the above described over-spray of coating into passage 12 can be controlled. FIG. 2B shows a special arrangement in which both the passage 12 and the direction of spray 30 are substantially normal to second surface 20. It has been found in this arrangement that when using plasma spray to deposit TBC, a capillary type effect occurs on the overspray within the passage, tending increasingly to cool the overspray as it penetrates the passage to the point at which it no longer can deposit on the inner walls of the passage. Evaluation of the present invention has shown that this generally occurs at about ¼ the length of the passage. One method used for determining the size of the second opening for a selected first opening, coating method and coating thickness range was to generate a series of sample passages through walls of a series of alloy specimens. Then the coating was deposited in a series of thicknesses within the thickness range on the second surface and within the passage through the second opening. The coating amount within the passage was measured for each of the series as a basis for selecting the size range of the second opening to be generated, according to the present invention, in order to avoid detrimental fluid flow blockage through the passage For gas turbine engine articles using a laser to drill holes in high temperature alloys, with TBC it is preferred that holes on the cooler side of the article wall, representing first openings 14, have a diameter in the range of about 0.01–0.03", and the holes on the hotter side of the article wall on which the protective coating is deposited have a larger diameter and in the range of about 0.02–0.04". If other material removal methods are used for gas turbine engine articles, for example electro-discharge drilling, first openings with diameters in the range of about 0.01–0.04", and second openings in the range of about 0.02–0.1" can be used. The preferred coating thickness for TBC on such articles having first openings in the range of about 0.01–0.03" is in the range of about 0.005" to less than about 0.015" to avoid detrimental reduction in fluid flow.

The present invention generates second opening 18 to have a cross sectional area greater than the cross sectional area of opening 14 by an area amount no less than a reduction in coating cross sectional area resulting from the partial depositing of the coating within passage 12 from such overspray. The method of the present invention provides the flexibility of controlling the coating and its overspray as a function of the angle of the passage, the increased size of the second opening and the angle of coating deposition so as to maintain fluid flow through the passage established by the first, control opening.

In one evaluation of the present invention, a cleaned combustor wall of about 0.080" wall thickness and of commercially available Hastelloy X alloy was drilled using a controlled Nd:Yag laser drill to provide a plurality of passages of about 0.02" through the wall. Then the laser focus was expanded to generate on one wall surface, representing surface 20 in the drawing, a plurality of openings for each passage of about 0.03", representing second opening 18 in the drawing. Laser drilling tends to generate a small recast surface and perhaps some burrs. Therefore, the passages and openings were deburred and cleaned by blasting with a slurry of about 20 wt % alumina powder in water to remove recast and burr material and surface contaminants. Then surface 20 including the larger openings 18 was given a metallic bond coat of a NiCrAlY alloy to a thickness of about 0.004–0.006". The bond coat was then coated with a TBC of, by weight, about 92% zirconia stabilized with about 8% yttria using a traversing plasma spray apparatus including a plasma spray gun commercially available as Metco Plasma Gun 7 MB at an angle of about 45°, in a nitrogen and hydrogen atmosphere, to a thickness of about 0.008–0.010". Overspray from the plasma spraying deposited TBC within the passage through second opening 18 as shown in FIG. 1. Resulting from this example of practice of the present invention was an article wall including a plurality of cooling passages therethrough and on one surface a protective coating, the deposition of which was included within the passages but did not reduce fluid flow through the passage below an amount established by a passage opening on a wall surface opposite the coated surface. Therefore, there was no need to remove overspray coating deposited in the passages through the second openings. However, with the above described relative sizes for the first opening of about 0.02" and the second opening of about 0.03", a TBC coating of about 0.015" reduced fluid flow through the passage. Therefore, according to the present invention, the size of the second opening must be enlarged from the sizes in this example for use with a TBC having a thickness approaching about 0.015".

As was mentioned above, when laser drilling was used to generate passage 12, a passage preform was drilled in one controlled pass over surface 20 with a diameter of fluid flow establishing opening 14. Then the laser focus was expanded to generate, in a second controlled pass over surface 20, a larger opening 18, according to the present invention. Resulting from this operation was a tapered passage of the type shown in FIGS. 1 and 2.

Figure 3:
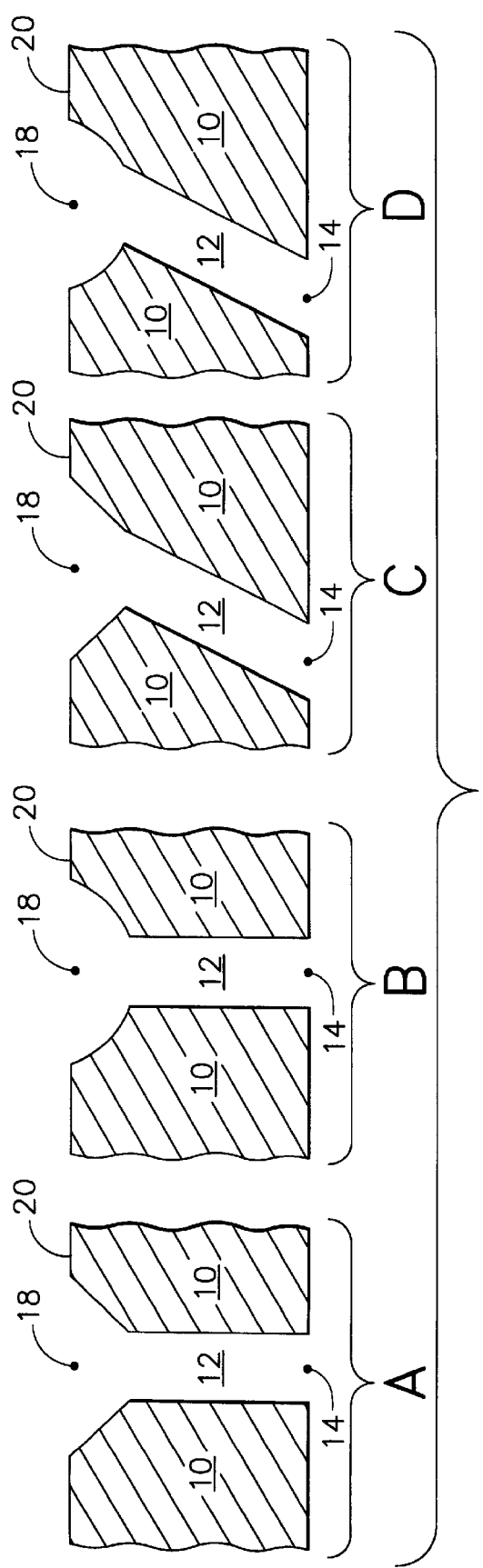
FIG. 3 is a diagrammatic cross sectional view of a series, identified as A, B, C and D, of types of shapes for the second opening in the second surface.
Figure 4:
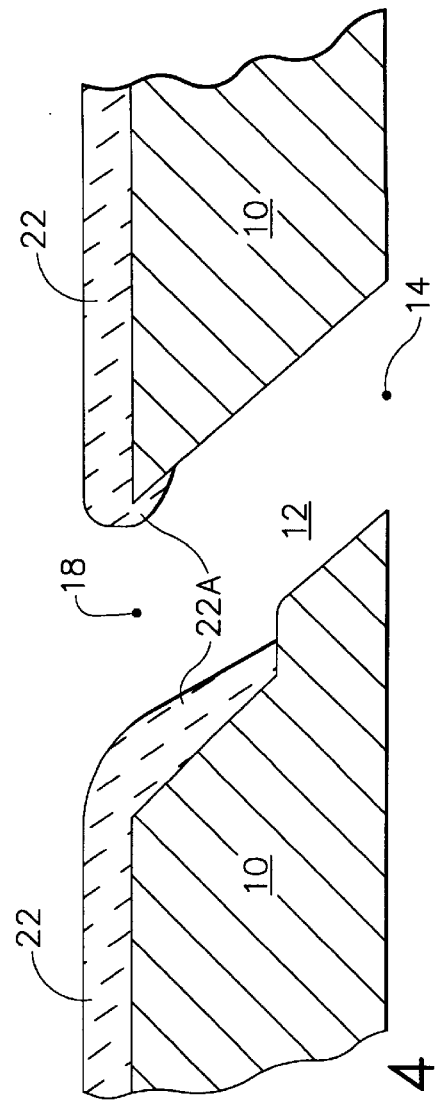
FIG. 4 is a fragrmentary sectional view of another form of fluid cooled wall as in FIG. 1.

It should be understood, however, that the present invention can include passage and opening shapes other than such a taper so long as the relative opening sizes described above are maintained. Shown in the fragmentary sectional views A, B, C, and D of FIG. 3 and in FIG. 4 are some examples of other shapes. In FIG. 3 A and C, second opening 18 can be provided by an operation similar to countersinking in surface 20. In FIG. 3 B and D, second opening 18 can be provided by an operating which indents surface 20. As was mentioned above, the cross section of passage 12 and openings 14 and 18 need not be the same in shape nor need they be circular, so long as the relationships of the present invention are maintained. In the fragmentary sectional view of FIG. 4, passage 12 at second opening 18 has non-uniformly shaped walls. This is a form of countersink to accommodate the deposition of coating amount 22A within the passage without detrimental reduction in fluid flow through the passage, according to the present invention.

The present invention has been described in connection with various embodiments, examples and combinations. However, it should be understood by those skilled in the arts involved that this invention is capable of a variety of modifications, variations and amplifications without departing from its scope as defined in the appended claims.

We claim:

1. In a method for making a fluid cooled article including a wall having therethrough a fluid cooling passage extending from a first opening in a first wall surface to a second opening in a second wall surface, the second wall surface including a protective coating thereon at least adjacent the second opening, the steps of:

selecting a first cross sectional area for the first opening to establish a desired amount of cooling fluid flow through the fluid cooling passage;

selecting a coating method for deposit of the protective coating on the second wall surface at least about the second opening, the method partially depositing a coating amount within the passage at the second opening;

selecting a coating thickness range for the coating on the second wall surface, by the coating method, at least adjacent the second opening;

generating the fluid cooling passage through the wall, prior to coating, so that the first opening has the first cross sectional area and the second opening has a second cross sectional area greater than the first cross sectional area by an area amount which is no less than a reduction in coating cross sectional area resulting from the partial depositing of the coating within the passage at the second opening; and, depositing the coating on the second wall surface with the coating method, within the selected coating thickness range, at least adjacent the second opening.

2. The method of claim 1 in which, after selection of the first cross sectional area for the first opening, selection of the coating method, and selection of the coating thickness range, the steps of:

generating a series of sample passages;

depositing the coating in a series of coating thicknesses, within the selected thickness range, on the second surface about the second opening; and measuring the coating amount deposited within the passage at the second opening for each of the series of thicknesses as a basis for generating the second cross sectional area of the second opening, prior to coating, to be greater than the first cross sectional area of the first opening.

3. The method of claim 2 in which the coating amount deposited within the passage is measured by a reduction in fluid flow through the passage from the first opening through the second opening.

4. In a method for making an air cooled gas turbine engine article from a high temperature alloy based on an element selected from the group consisting of Fe, Ni, and Co, the article including a wall having therethrough an air cooling passage of substantially circular cross section within the wall and extending from a first opening in a first wall surface to a second opening in a second wall surface, the second wall surface including a thermal protective coating thereon at least adjacent the second opening, the steps of:

selecting a first diameter for the first opening to establish a desired amount of cooling air flow through the air cooling passage;

selecting a thermal protective coating method for deposit of the coating on the second wall surface at least about the second opening, the method partially depositing a coating amount within the passage at the second opening;

selecting a coating thickness range for the coating on the second wall surface, by the coating method, at least adjacent the second opening;

generating the air cooling passage through the wall, prior to coating, so that the first opening has a first diameter and the second opening has a second diameter greater than the first diameter by an amount which is no less than a reduction in the first diameter resulting from the partial depositing of the coating within the passage at the second opening; and, depositing the coating on the second wall surface with the coating method, within the selected coating thickness range, at least adjacent the second opening.

5. The method of claim 4 in which:

the thermal protective coating is a Thermal Barrier Coating;

the selected diameter of the first opening is in the range of about 0.01–0.04"; and, the selected diameter of the second opening is in the range of about 0.020–0.1".

6. The method of claim 5 in which:

the passage is generated through the wall using a laser;

the selected diameter of the first opening is in the range of about 0.01–0.03";

the selected diameter of the second opening is in the range of about 0.020–0.040"; and, the selected coating thickness range on the second surface is from about 0.005" to less than about 0.015".

\* \* \* \* \*